US008422219B2

(12) United States Patent
Lo et al.

(10) Patent No.: US 8,422,219 B2
(45) Date of Patent: Apr. 16, 2013

(54) COMPUTER SYSTEM

(75) Inventors: Chien-Hung Lo, Taipei Hsien (TW);
Xiang Cao, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 328 days.

(21) Appl. No.: 12/981,559

(22) Filed: Dec. 30, 2010

(65) Prior Publication Data

US 2012/0162908 A1   Jun. 28, 2012

(30) Foreign Application Priority Data

Dec. 28, 2010  (CN) .......................... 2010 1 0609178

(51) Int. Cl.
*G06F 1/16* (2006.01)
(52) U.S. Cl.
USPC ....... 361/679.55; 345/156; 439/352; 713/322
(58) Field of Classification Search .................. 713/190, 713/193, 320, 300, 189, 324, 322, 600; 165/104.33, 165/185, 122; 361/679.09, 679.28, 679.55, 361/679.08, 679.47, 679.58, 679.26, 679.54, 361/679.29, 679.01, 679.48, 679.32, 679.22, 361/679.18, 679.41, 679.04, 679.59, 679.38, 361/679.39; 345/173, 520, 505, 170, 102, 345/685, 98, 156, 213, 531, 212, 87; 439/64, 439/65, 638, 260, 495, 131, 352; 174/260, 174/252, 255, 262, 78, 261

See application file for complete search history.

(56) References Cited

U.S. PATENT DOCUMENTS

| 7,489,507 B2 * | 2/2009 | Karashima et al. ...... 361/679.28 |
| 2004/0037030 A1 * | 2/2004 | Kuo et al. ..................... 361/683 |
| 2011/0164367 A1 * | 7/2011 | Huang ..................... 361/679.09 |

* cited by examiner

*Primary Examiner* — Hung Duong
(74) *Attorney, Agent, or Firm* — Altis Law Group, Inc.

(57) ABSTRACT

A computer system includes a notebook computer host, a supporting bracket, and a tablet personal computer (PC). The notebook computer host includes a motherboard. A receiving recess is formed in the supporting bracket. A connector is mounted on the receiving recess and connected to the motherboard of the notebook computer host. The tablet PC is detachably received in the receiving recess. A connection interface is mounted on the tablet personal computer. When the tablet PC is received in the receiving recess, the connection interface is connected to the connector, the tablet PC is powered on after powering on the notebook computer host. When the tablet PC enters a first operating system, the tablet PC functions as a display and a hard disk drive connected to the notebook computer host to communicate with the motherboard of the notebook computer host.

5 Claims, 3 Drawing Sheets

COMPUTER SYSTEM

BACKGROUND

1. Technical Field

The present disclosure relates to a computer system.

2. Description of Related Art

With the development of light-duty mobile computers, such as tablet personal computers, the application range of computers are becoming ever greater. However, when some complicated, CPU-intensive work needs to be done, the light-duty computers cannot live up to the demand, so that those tasks have to be done on a computer with more powerful processing capabilities. However, after the work done, the results often need to be transferred to a light0-duty computer, thus, it is inconvenient.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
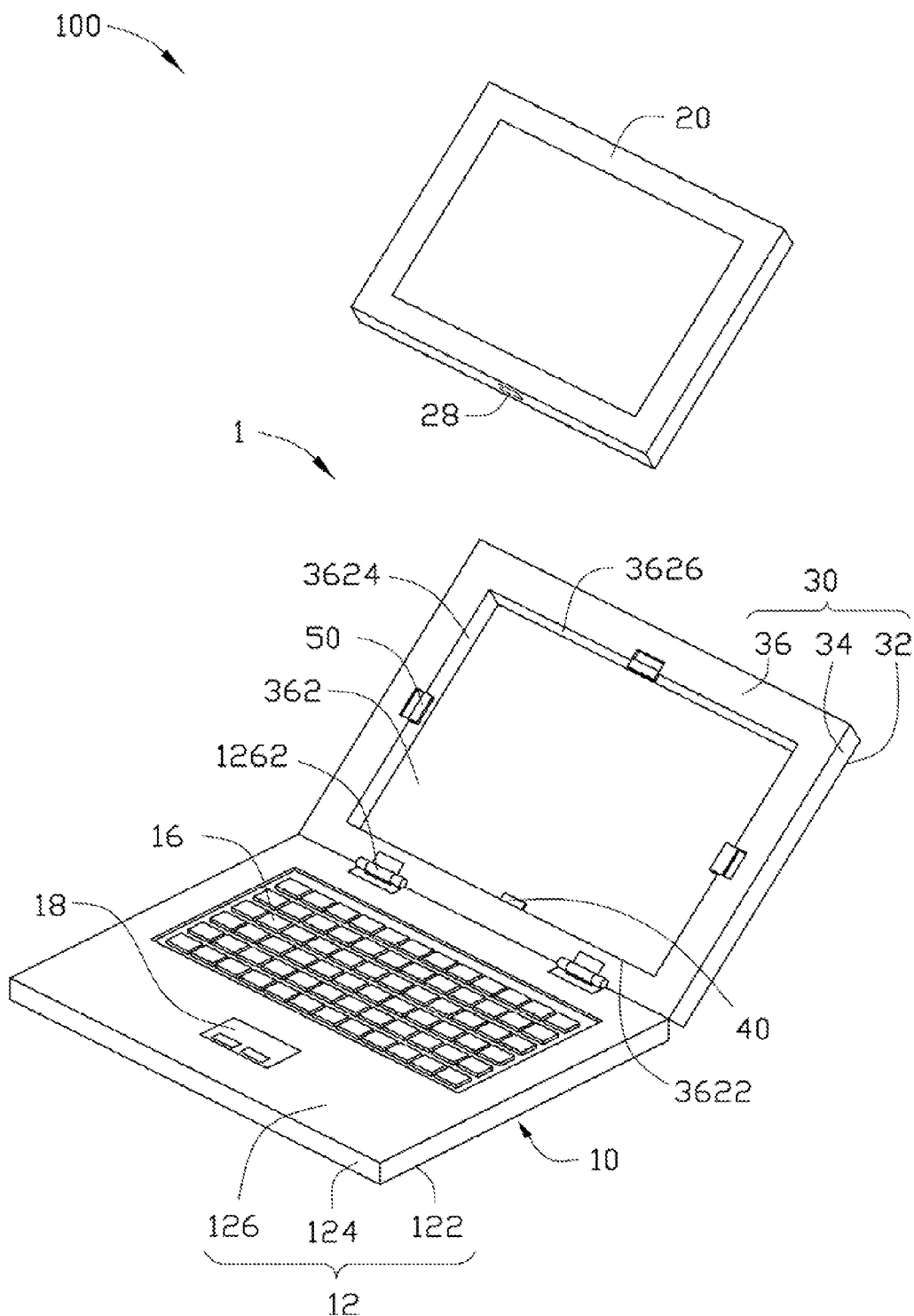
FIG. 1 is an exploded, and isometric view of an exemplary embodiment of a computer system.
Figure 2:
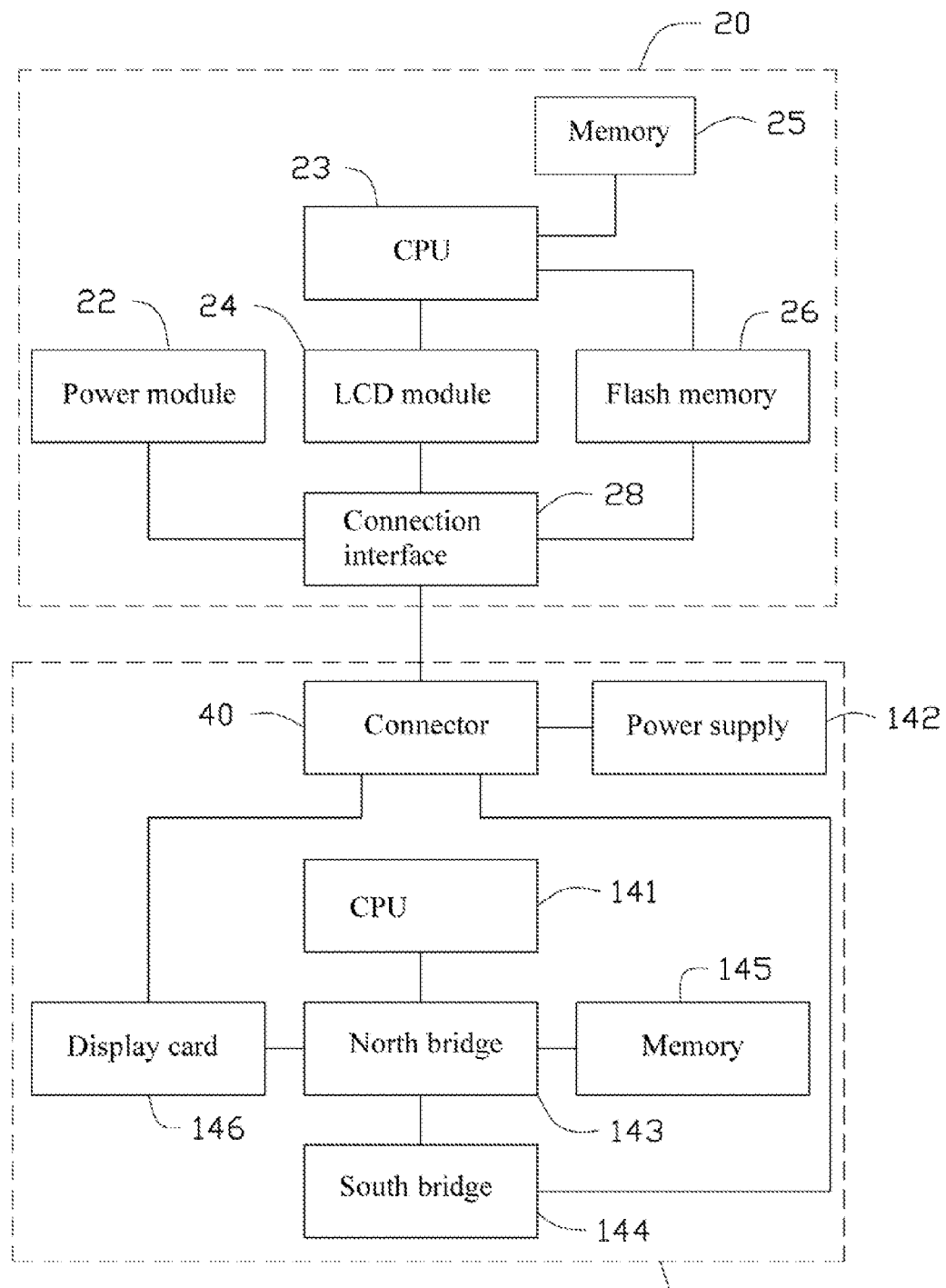
FIG. 2 is block diagram of the computer system of FIG. 1.

Referring to FIGS. 1 and 2, an exemplary embodiment of a computer system 100 includes a notebook computer base 1 and a tablet personal computer (PC) 20 detachably mounted to the notebook computer base 1. The notebook computer base 1 includes a notebook computer host 10 and a supporting bracket 30 rotatably connected to the notebook computer host 10.

The notebook computer host 10 includes an enclosure 12, a motherboard 14 received in the enclosure 12, a keyboard 16 mounted on the enclosure 12, and a mouse touch board 18 mounted on the enclosure 12. The enclosure 12 includes a bottom wall 122, a top wall 126 opposite and substantially parallel to the bottom wall 122, and four sidewalls 124 substantially perpendicularly connected between sides of the bottom wall 122 and top wall 126. Two through holes (not shown) are defined in the top wall 126 to receive the keyboard 20 and the mouse touch board 18. The back side of the top wall 126 is rotatably connected to the supporting bracket 30. A receiving space (not shown) is bound by the bottom wall 122, the top wall 126, and the four sidewalls 124 to receive the motherboard 14.

The supporting bracket 30 is used to receive the tablet PC 20. The supporting bracket 30 includes a back wall 32, a front wall 36 opposite and substantially parallel to the back wall 32, and four sidewalls 34 substantially perpendicularly connected between sides of the back wall 32 and front wall 36. A bottom side of the front wall 36 is rotatably connected to the back side of the top wall 126 of the notebook computer host 10. A receiving recess 362 is depressed in the front wall 36 of the bracket 30 to receive the tablet PC 20. A plurality of flexible latching elements 50 are formed on two sidewalls 3624 and a top wall 3626 of the receiving recess 362, to engage corresponding sides of the tablet PC 20, thereby to fix the tablet PC 20 in the receiving recess 362. A connector 40 is mounted on a bottom wall 3622 of the receiving recess 362, adjacent to the notebook computer host 10.

The motherboard 14 includes a central processing unit (CPU) 141, a power supply 142, a north bridge 143, a south bridge 144, a memory 145, and a display card 146. The power supply powers the CPU 141, the north bridge 143, the south bridge 144, the memory 145, and the display card 146. The north bridge 143 is connected to the CPU 141, the display card 146, the memory 145, and the south bridge 144. The display card 146, the south bridge 144, and the power supply 142 are connected to the connector 40.

The tablet PC 20 includes a power module 22, a CPU 23, a liquid crystal display (LCD) module 24, a memory 25, and a flash memory 26. The CPU 23 is connected to the LCD module 24, the flash memory 26, and the memory 25. A connection interface 28 is mounted on a bottom side of the tablet PC 20. The connection interface 28 is connected to the power module 22, the LCD module 24, and the flash memory 26. The power module 22 powers the LCD module 24, the CPU 23, the LCD module 24, the memory 26, and the flash memory 26. A first operating system and a second operating system are stored in the flash memory 26.

Figure 3:
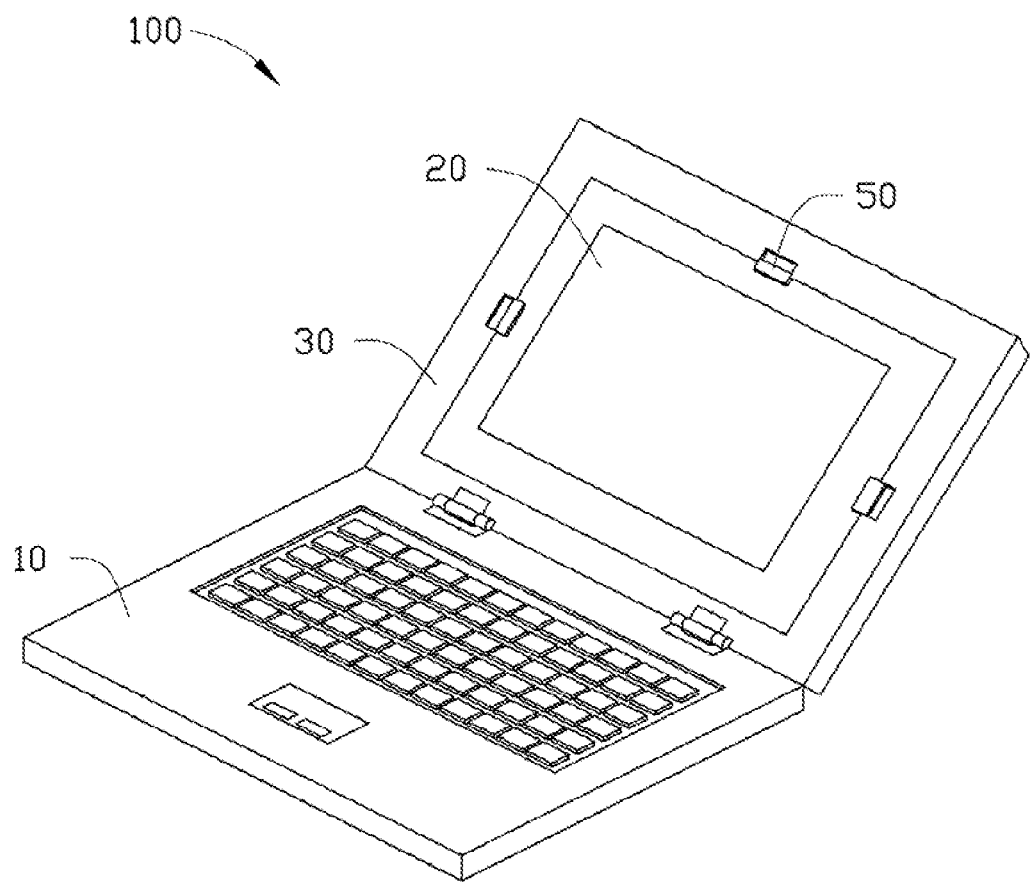
FIG. 3 is an assembled, isometric view of the computer system of FIG. 1.

Referring to FIG. 3, When the tablet PC 20 is mounted in the receiving recess 362, the connector 40 is inserted into the connection interface 28. The latching elements 50 resist against the tablet PC 20 to avoid the tablet PC 20 falling from the supporting bracket 30. At that time, the power module 22, the LCD module 24, and the flash memory 26 of the tablet PC 20 are respectively connected to the power supply 142, the display card 146, and the south bridge 144 of the notebook computer host 10 by the connection interface 28 and the connector 40. When the notebook computer host 10 is powered on, the power supply 142 supplies a voltage for the power module 22. The tablet PC 20 is powered on. The display card 146 outputs video signals to the LCD module 24. The tablet PC 20 displays the first and second operating systems to remind users to select one of the first and second operating systems.

When the first operating system is selected, the tablet PC 20 is used to function as a display and a hard disk drive (HDD) connected to the notebook computer host 10 to communicate with the notebook computer host 10. The communication process between each of the display and the HDD, and the notebook computer host 10 falls within well-known technologies, and are therefore not described here.

When the second operating system is selected, the tablet PC 20 does not communicate with the notebook computer host 10, but functions as a separate operating system to work. A work process of the tablet PC 20 falls within well-known technologies, and is therefore not described here.

When the tablet PC 20 needs to be received in the receiving recess 362 and moved with the notebook computer host 10 together, the supporting bracket 30 can covered on the notebook computer host 10.

When the tablet PC 20 needs not to be received in the receiving recess 362 to be used, and after the tablet PC 20 is powered on, only the second operating system can be selected.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A computer system comprising:
   a notebook computer host comprising a motherboard;
   a supporting bracket rotatably connected to the notebook computer host, wherein a receiving recess is defined in the supporting bracket, a connector is mounted on the receiving recess and connected to the motherboard of the notebook computer host; and
   a tablet personal computer (PC) detachably received in the receiving recess, wherein a connection interface is mounted on the tablet personal computer;
   wherein when the tablet PC is received in the receiving recess, the connection interface is connected to the connector, the tablet PC is powered on after powering on the notebook computer host, when the tablet PC enters a first operating system, the tablet PC functions as a display for the notebook computer host and a hard disk drive connected to the notebook computer host to communicate with the motherboard of the notebook computer host.

2. The computer system of claim 1, wherein the supporting bracket comprises a back wall, a front wall opposite and parallel to the back wall, and four sidewalls connected between sides of the back wall and front wall, the receiving space is defined in the front wall, a bottom side of the front wall is rotatably connected to the notebook computer host.

3. The computer system of claim 2, wherein the connector is mounted on a bottom wall of the receiving recess, a flexible latching element is respectively mounted on each of two opposite sidewalls and a top wall of the receiving recess, to engage with a corresponding side of the tablet PC.

4. The computer system of claim 1, wherein the motherboard comprises a power supply, a display card, and a south bridge, the connector is connected to the power supply, the display, and the south bridge, the tablet PC comprises a power module, a liquid crystal display (LCD) module, and a memory, when the connection interface is connected to the connector, the power module, the LCD module, and the memory are respectively connected to the power supply, the display card, and the south bridge by the connection interface and the connector.

5. The computer system of claim 1, wherein the first operating system and a second operating system are stored in the tablet PC, to be selected, when the first operating system is selected, the tablet PC enters the first operating system, when the second operating system is selected, the tablet PC enters the second operating system to function as a separate operating system to be disconnected from the notebook computer host.

* * * * *